United States Patent [19]

Rowland

[11] Patent Number: 5,306,556
[45] Date of Patent: Apr. 26, 1994

[54] GASKETS AND SEALING MATERIAL

[75] Inventor: Michael Rowland, Altrincham, United Kingdom

[73] Assignee: R. K. Carbon Fibers, Ltd., Scotland

[21] Appl. No.: 788,849

[22] Filed: Nov. 7, 1991

[51] Int. Cl.$^5$ ............................................. B32B 9/00
[52] U.S. Cl. ........................... 428/293; 428/221; 428/222; 428/224; 428/284; 428/285; 428/289; 428/292; 428/357; 428/362; 428/364; 428/367; 428/371; 428/373
[58] Field of Search ............... 428/284, 285, 289, 408, 428/902, 221, 222, 224, 292, 293, 357, 362, 364, 367, 371, 373

[56] References Cited

U.S. PATENT DOCUMENTS

| | | | |
|---|---|---|---|
| 4,902,563 | 2/1990 | McCullough, Jr. et al. | 428/284 |
| 4,944,999 | 7/1990 | McCullough, Jr. et al. | 428/371 |
| 4,950,533 | 8/1990 | McCullough, Jr. et al. | 428/292 |
| 4,956,235 | 9/1990 | McCullough et al. | 428/368 |
| 4,978,571 | 12/1990 | McCullough, Jr. et al. | 428/263 |
| 4,997,716 | 3/1991 | McCullough et al. | 428/411.1 |
| 5,028,477 | 7/1991 | McCullough, Jr. et al. | 428/263 |
| 5,030,509 | 7/1991 | McCullough, Jr. et al. | 428/284 |
| 5,034,267 | 7/1991 | McCullough, Jr. et al. | 428/284 |

Primary Examiner—Patrick J. Ryan
Assistant Examiner—Abraham Bahta
Attorney, Agent, or Firm—John Lezdey

[57] ABSTRACT

The present invention relates to a novel chemical and oxidation resistant gasketing or sealing material, such as packing yarn. More particularly, there is provided packing yarn comprising carbonaceous fibers which can be used at temperatures over 400° C. that derived from oxidized polyacrylonitrile fibers and have good dry lubricity.

12 Claims, 1 Drawing Sheet

GASKETS AND SEALING MATERIAL

FIELD OF THE INVENTION

The present invention relates to a novel chemical and oxidation resistant sealing and gasketing material such as packing yarn or chopped fiber packing. More particularly, there is provided a packing yarn comprising carbonaceous fibers derived from oxidized polyacrylonitrile fibers having good dry lubricity and which can be used in temperatures over 400° C.

BACKGROUND OF THE INVENTION

Packing yarns are generally used as seals for shafts and other mechanical devices. Packing yarns during use in their environments undergo a variety of stresses and strains which cause fiber breakage. Fibers with improved elongability are capable of better withstanding these stresses and strains.

When carbon and graphitic fibers are produced from a stabilized acrylic precursor fiber, the extensibility or percent extension is typically in the range of 1.25 to 1.9%, depending upon the heat treatment, the degree of carbonization or graphitization and modulus of the fiber. Typical linear graphitic or carbon fibers are produced by processing tows of from 1,000 to 320,000 filaments through a zone temperature furnace which heat treats the fiber in a temperature range of from about 300° C. graduated rapidly up to about a 1050° to 1100° C. temperature range. This treatment is generally followed by a subsequent heat treatment in a high temperature furnace where the fiber is taken up at a temperature of from about 1400° to 2400° C. The heat treatment is carried out under tension even in a low temperature furnace. That is, the fibers are suspended through the furnace with sufficient tension to pull the fiber tows through the furnace and keep them off the floor or bottom of the furnace. It is especially advantageous if one desires to utilize the carbonaceous fibers as packing yarn to have a percent elongation of from about 2.5% or greater. When a partially carbonized fiber, that is, a fiber which still has a nitrogen content of from 12 to 20%, is heat treated at from 550° to 650° C. under tension, the extensibility of the fiber is only 2.0% or less. This low extensibility is insufficient for use as packing yarn without encountering considerable fiber breakage when placed into a packing gland or recess.

Ideal packing yarns are those having the favorable characteristics of 1) not being friable, 2) resistant to chemicals, 3) high strength, 4) good lubricity, 5) good compressive properties, and 6) can be used at temperatures over 350° C.

Current fibers which are not used for packing yarn, such as Kevlar, Nomex and Teflon, cannot be used at temperatures over 350° C. because they undergo decompostion or soften. Even with glass fibers it is advisable not to exceed temperatures over 400° C. Asbestos is suitable for use as packing yarn but it is being replaced in most systems.

U.S. Pat. No. 4,347,297 to Mishima et al discloses a process for the preparation of carbon fibers by two preoxidation treatments of polyacrylonitrile fibers under tension and the carbonizing of the oxidized fibers under tension.

U.S. Pat. No. 4,279,612 to Saji et al discloses a method for producing carbon fibers which includes the step of thermally stabilizing the fibers under tension before heat treatment to carbonize the fibers.

U.S. Pat. No. 3,541,582 to Fainborough et al which discloses the preparation of woven carbon cloth by first oxidizing continuous yarns of polymeric fibers while under tension. The carbonization step is performed either while under tension or without tension. However, the woven cloth inherently places the fibers under tension.

U.S. Pat. No. 4,837,076 to Mc Cullough et al which is herein incorporated by reference discloses a process for preparing non-linear carbonaceous fibers, yarns and tows having a reversible deflection greater than 1.2:1. The conditions for heat treatment described in the patent can be used to provide similar electrical conductivity to linear fibers. However, non-linear fibers form yarns that are too bulky for use as packing yarn.

The term "carbonaceous fibers" is understood to mean fibers, which have been heated to have an increased carbon content, namely, a carbon content of greater than 65% as a result of an irreversible chemical reaction.

It is to be understood that the percentage stated relate to percent by weight of the total composition unless stated otherwise.

SUMMARY OF THE INVENTION

In accordance with the invention there is provided a chopped fiber packing for packing yarn or for use as gaskets or seals for shafts and other mechanical devices comprising linear carbonaceous fibers having a nitrogen content of about 12 to 22% which are derived from oxidized polyacrylonitrile fibers and have a percent elongation of at least 2.0%. The fibers are chemically resistant and can withstand temperatures over 400° C. Advantageously, the fibers are blended with other fibers having high tensile strength and good lubricity such as oxidized polyacrylontrile, aromatic polyamides such as Kevlar and Nomex, and the like. The packing yarns of the invention have all the aforementioned favorable characteristics. They may be formed from either chopped or continuous fibers. The chopped fibers are particularly desirable for forming a compression gasket.

Further benefits and advantages of the present invention will become apparent upon a reading of the descripton of the preferred embodiments taken in conjunction with the accompanying drawings.

DESCRIPTION OF THE PREFERRED EMBODIMENTS

Figure 1:
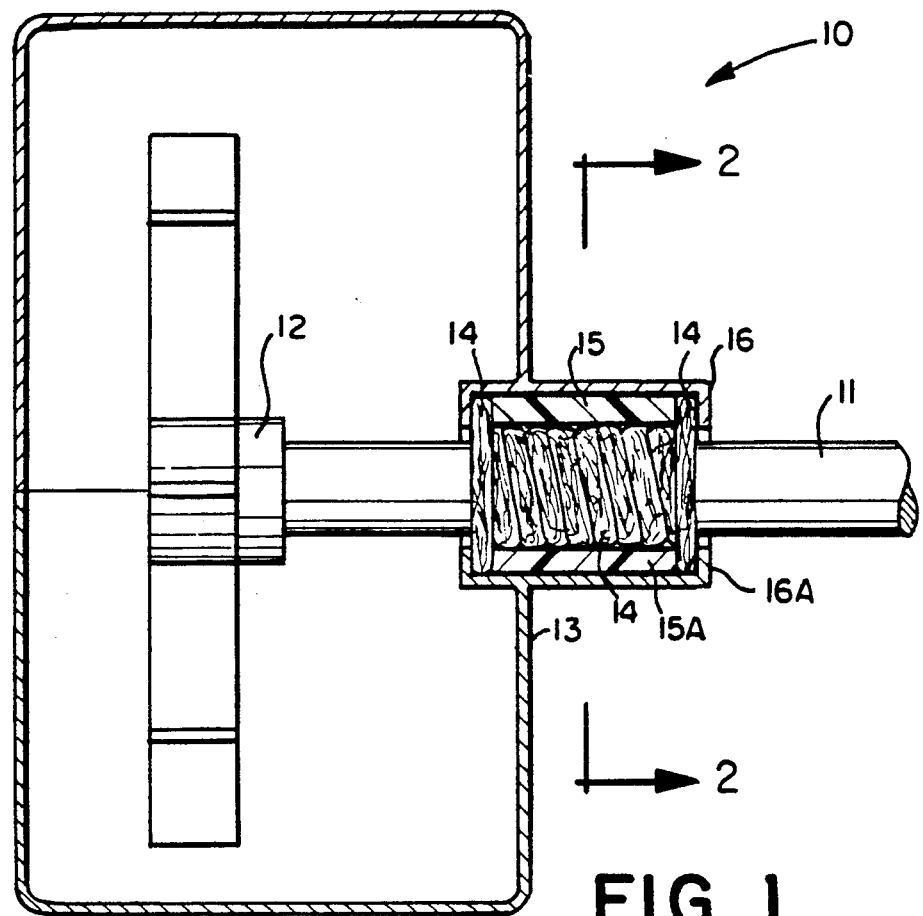
FIG. 1 is a partial cross-sectional side view of a pump with the packing yarn of the invention.

Although specific terms are used in the following description for the sake of clarity, these terms are intended to refer only to the particular structure of the invention selected for illustration in the drawings, and are not intended to define or limit the scope of the invention.

Figure 2:
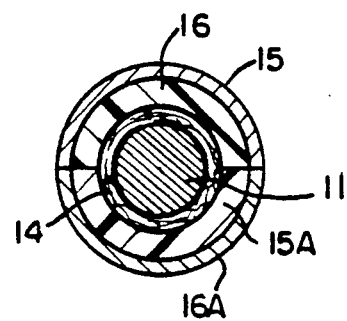
FIG. 2 is a cross-sectional end view along the shaft of the pump of FIG. 1.

FIGS. 1 and 2, illustrate a pump 10 having shaft 11 with a impeller 12. A seal is formed around the shaft 11 in association with the wall 10 of a container 13 which houses the impeller 12. A seal is formed with the packing yarn 14 of the invention which is in contact with compression plates 15,15a that are held by packing flanges 16,16A.

The carbonaceous fibers which comprise the packing yarn of the invention have the characteristics of good lubricity, chemical resistance, improved elongability, do not soften or decompose at a temperature of 400° C., have good compressive properties when in yarn and have a Limiting Oxygen Index (LOI) greater than 40.

The carbonaceous fibers of this invention have an LOI value greater than 40 when the fibers are tested according to the test method of ASTM D 2863-77. The test method is also known as "oxygen index" or "limited oxygen index" (LOI). With this procedure the concentration of oxygen in $O_2/N_2$ mixtures is determined at which a vertically mounted specimen is ignited at its upper end and just barely continues to burn. The width of the specimen is 0.65 to 0.3 cm with a length of from 7 to 15 cm. The LOI value is calculated according to the equation:

$$LOI = \frac{[O_2]}{[O_2] + [N_2]}$$

Briefly, the carbonaceous fibers used in the yarn of this invention are prepared by heat treating in an inert atmosphere a suitable stabilized or oxidized precursor polyacrylonitrile fiber which can be made into an irreversibly heat set, fiber or filament without tension or stress.

The precursor materials, namely the stabilized polyacrylonitrile fibers which are advantageously utilized in preparing the carbonaceous fibers of the invention are selected from one or more of the following: acrylonitrile homopolymers, acrylonitrile copolymers and acrylonitrile terpolymers. The copolymers preferably contain at least about 85 mole percent of acrylonitrile units and up to 15 mole percent of one or more monovinyl units (e.g. styrene, methylacrylate, methyl methacrylate, vinyl chloride, vinylidene chloride, vinyl pyridine and the like) copolymerized. The acrylic filaments may also comprise terpolymers wherein the acrylonitrile units are at least about 85 mole percent.

The preferred precursor materials are typically prepared by melt spinning, dry or wet spinning the precursor materials in a known manner to yield a monofilament or multifiber tow. The fibers, or tow are then heated at a temperature between about 500° and 800° C. and for a period of time as described in U.S. Pat. No. 4,837,076 so that the nitrogen content is in the range of about 12 to 22% and the elongation is greater than about 2.0%.

The polyacrylonitrile (PAN) based fibers may be formed by conventional methods such as by melt, dry or wet spinning a suitable liquid of the precursor material. The polyacrylonitrile (PAN) based fibers which have a normal nominal diameter of from 4 to 25 micrometers are collected as an assembly of a multiplicity of continuous filaments in tows. The fibers are then stabilized, for example by oxidation or any other conventional method of stabilization. The stabilized fibers or tows are thereafter heat treated in a relaxed and unstressed condition, at temperatures of about 500°-800° C. in an inert non-oxidizing atmosphere for a period of time to produce a heat induced thermoset reaction while maintaining a nitrogen content of between about 12 to 22%. At a temperature range of from 500° to 800° C., the fibers are provided with a substantially permanent or irreversible heat set. It is understood that the percent elongation and the treatment temperatures will vary with respect to the nitrogen content according to the types of acrylonitrile fibers utilized.

The carbonaceous fibers used in preparing the gaskets or sealing material of the invention are either electrically non-conductive or partially electrically conductive (i.e., having a low conductivity) or have static dissipating characteristics and have a carbon content of not more than 80%. Low conductivity means that a 6K tow of fibers in which the precursor fiber have a single fiber diameter of from 4 to 20 microns, has a tow resistance of from about $4 \times 10^6$ to $4 \times 10^3$ ohms/cm. The preferred fibers of this group have an elongation of at least 2.0 percent and a tenacity of from about 2 to 7 g/d.

The carbonaceous fibers may be continuous or chopped, used alone or blended with other synthetic non-carbonaceous high tensile strength fibers to form yarns having good lubricity such as Kevlar, Nomex, oxidized polyacrylontrile (PANOX of RK Carbon Fibers Ltd), and the like.

The non-carbonaceous fibers can be present in an amount up to about 20%.

The chopped fibers can be combined with thermoplastic or thermosetting materials which are common for gaskets to form compression gaskets.

To further improve lubricity, the packing yarn or sealing materials of the invention may be coated with materials which reduce friction such as Teflon, graphite, and the like.

It is understood that all percentages used herein are based on weight percent. Exemplary of the present invention are the following examples:

EXAMPLE 1

An oxidized acrolynitrile based precursor fiber, sold under the name PANOX by R.K. Carbon Fibers, Inc., Philadelphia, Pa., having a density of 1.36-1.39 g/cc and at least 85 mole percent of acrylonitrile units, is heat treated in a furnace at a temperature of from 500° to 800° C. in a purged nitrogen environment so as to produce a partially carbonized fiber having an elongation of between 4 to 6%. In lieu of a purged nitrogen atmosphere, the system may be purged with nitrogen and then evacuated.

EXAMPLE 2

Following the general procedure as outlined in Example 1 as to source of precursor fiber and furnace, the precursor fiber is chopped into from 1.5 to 3 inch staple. The fiber is placed on a fine mesh belt and pulled through the furnace without tension on the fiber to produce staple partially carbonized fiber having an elongation of from 4 to 7%.

EXAMPLE 3

A series of PANOX fibers were heat treated pursuant to Example 1 to determine the effect of the treatment temperature on the degree of elongation to break. The results are as follows:

| Treatment Temperature °C. | % Elongation |
| --- | --- |
| 400 | 2.6 |
| 600* | 3.9 |
| 800 | 2.3 |
| 900 | 1.7 |

-continued

| Treatment Temperature °C. | % Elongation |
|---|---|
| 1000 | 1.6 |

*Nitrogen content - 20.3%

What is claimed is:

1. In a mechanical device having a chopped fiber packing or gasketing or sealing yarn, the improvement wherein said yarn or chopped fiber packing comprises linear carbonaceous fibers having a carbon content of greater than 65 percent and not more than 78 percent, and an elongation to break of greater than 2.0% said carbonaceous fibers being derived from heat treated oxidized fibers selected from acrylonitrile homopolymers, acrylonitrile copolymers and acrylonitrile terpolymers.

2. The device of claim 1, wherein said fibers have a tenacity from about 3 to 7 g/d when measured on a 6K tow of fiber having a single fiber diameter of 4 to 20 microns.

3. The device of claim 1 wherein said carbonaceous fiber has an elongation to break about 3 to 6% and a tenacity from about 3 to 7 g/d when measured on a 6K tow of fibers having a single fiber diameter of 4 to 20 microns.

4. The device of claim 1, wherein said carbonaceous polymeric fiber has a nitrogen content of between about 12 and 22%.

5. A device of claim 1, wherein said yarn has an LOI greater than 40.

6. The device of claim 5, wherein said copolymers and terpolymers contain at least 85 mole percent acrylic units and up to 15 mole percent of one or more monovinyl units.

7. The device of claim 1, wherein the carbonaceous fiber prepared has a carbon content less than 78 percent, and wherein said fiber is electrically nonconductive, does not possess any electrostatic dissipating characteristics, and has an electrical resistance of greater than $4 \times 10^3$ ohms/cm, when measured on 6K tow of fibers having a single fiber diameter of 4 to 20 microns.

8. The device of claim 1 wherein said yarn is coated with graphite.

9. The device of claim 1, wherein said yarn is formed from chopped fibers.

10. The device of claim 1, wherein said yarn is a packing yarn.

11. The device of claim 1, wherein said yarn forms a gasket.

12. The device of claim 1 wherein said device contains a compression gasket comprising chopped carbonaceous fibers.

* * * * *